United States Patent Office 3,325,533
Patented June 13, 1967

3,325,533
SALICYLATES OF HYDROXYMETHYLATED
DIPHENYL ETHER
Leonard R. Thompson, Midland, Mich., assignor to The Dow Chemical Company, Midland, Mich., a corporation of Delaware
No Drawing. Filed Aug. 19, 1965, Ser. No. 481,074
4 Claims. (Cl. 260—474)

This application is a continuation-in-part of my application Ser. No. 266,015, filed Mar. 18, 1963, now abandoned.

The present invention relates to new chemical compounds. These new compounds are esters of salicyclic acid with hydroxymethylated diphenyl ether, which esters have the general formula

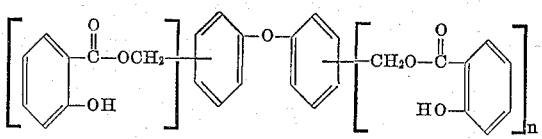

wherein $m$ and $n$ are integers from zero to two and the sum of $m$ and $n$ is at least one.

As pure compounds, the above esters are white crystalline solids with relatively low melting points. They are more easily obtained, however, as mixtures of esters of the above formula and such mixtures are ordinarily viscous liquids or supercooled liquids which are rarely induced to crystallize. These mixtures are at least as effective for many purposes as the pure compounds. The esters can be prepared by a conventional esterification reaction of salicylic acid or a salicylic acid derivative with a hydroxymethylated diphenyl ether. A particularly advantageous method for their preparation comprises reacting an inorganic salicylate, preferably the ammonium or alkali metal salt, with a chloromethylated diphenyl ether in the presence of a lower alkyl tertiary amine. Such cloromethylated diphenyl ethers are easily available from the chloromethylation of diphenyl ether.

The salicylate and chloromethylated ether reactants can be employed in any molar ratio but best results are obtained when the salicylate is in excess of the quantity theoretically required to react with all of the chloromethyl groups present. A lower alkyl tertiary amine such as triethylamine, tripropylamine, or N,N-di-methylbutylamine facilitates the reaction when present in about 0.1–10 percent by weight of the reactants. The presence in the reaction mixture of a similar quantity of alkali metal iodide usually helps to increase the yield of ester.

The reaction is accomplished merely by stirring the various components together, preferably at 75–175° C., until the reaction is substantially complete. It is usually most convenient to heat the reaction mixture as a slurry in an inert organic solvent, preferably a solvent having a boiling point within the reaction temperature range. Separation of the ester product is by conventional means.

EXAMPLE 1

A mixture of 158 g. of sodium salicylate, 134 g. of 4,4'-bis(chloromethyl)diphenyl ether, 2.5 g. of triethylamine, 2.5 g. of sodium iodide, and 200 g. of methyl ethyl ketone was stirred in a reaction flash for 5 hours at 85° C. Water was added at the end of the reaction period to dissolve precipitated sodium chloride. Analysis of the water layer thus formed indicated the presence of 96% of the theoretical amount of sodium chloride. The organic layer was separated and washed once with water, twice with 5% sodium bicarbonate solution, and again with water. The solvent was removed from the washed organic layer by distillation under reduced pressure, leaving as the distillation residue a viscous, light yellow oil. This oil was stirred with 200 ml. of a mixture of equal volumes of ethanol and light petroleum ether to induce crystallization. The resulting crystals were collected by filtration and washed with petroleum ether to obtain 183 g. of 4,4'-oxydibenzyl disalicylate. Recrystallization of this material yielded white crystals, M.P. 69–70.5° C., slightly to moderately soluble in organic solvents and insoluble in water. The identity of the product was confirmed by elemental analysis and by examination of its infrared absorption spectrum.

EXAMPLE 2

A reaction mixture of 320 g. of sodium salicylate, 138 g. of chloromethylated diphenyl ether, 2.5 g. of triethylamine, 2.5 g. of sodium iodide, and 300 g. of methyl ethyl ketone was stirred at 85° C. for 6 hours. The chloromethylated diphenyl ether starting material contained 14.9% by weight of monochloromethylated ether, mostly the para isomer, 25.1% of o,p'-bis(chloromethyl)diphenyl ether, 44% of p,p'-bis(chloromethyl)diphenyl ether, and 14% of tris(chloromethyl)diphenyl ether, largely the 2,4,4'-isomer. The reaction mixture was worked up as shown in Example 1 except that the product was not crystallized. The reaction product was a light yellow very viscous liquid, weight 240 g. This product was found to be a mixture of mono, di, and trisalicylates of the hydroxymethylated diphenyl ethers corresponding in their structure and in their molar proportion to the chloromethylated ethers present in that starting material. Compounds identified were ortho and para-phenoxybenzyl salicylate, 2,4'-oxydibenzyl disalicylate, 4,4'-oxydibenzyl disalicylate, and 2,4,4'-tris(hydroxymethyl)diphenyl ether trisalicylate.

EXAMPLE 3

The procedure of Example 2 was repeated using identical quantities of the same starting materials except that the chloromethylated diphenyl ether reactant was 106 g. of a mixture containing 5.8% by weight of a o,p'-bis(chloromethyl)diphenyl ether, 20.1% of p,p'-bis(chloromethyl)diphenyl ether, 49.9% of tris(chloromethyl)diphenyl ether and 13.0% of tetrakis(chloromethyl)diphenyl ether, the tris and tetrakis compounds being essentially the 2,4,4'- and the 2,2',4,4'-isomers respectively. The reaction product, obtained as in Example 2, was 190 g., of a yellow glassy solid which softened at about 35° C. This product was found to be a mixture of di, tri, and tetrasalicylates of the hydroxymethylated diphenyl ethers corresponding in structure and molar proportion to the chloromethylated diphenyl ethers in the starting material. The compounds identified were 2,4'-oxydibenzyl disalicylate, 4,4'-oxydibenzyl disalicylate, 2,4,4'-tris(hydroxymethyl)diphenyl ether trisalicylate, and 2,2',4,4'-tetrakis(hydroxymethyl)diphenyl ether tetrasalicylate.

EXAMPLE 4

A mixture of 160 g. of sodium salicylate, 211 g. of chloromethylated diphenyl ether, 2.5 g. of sodium iodide, and 2.5 g. of triethylamine was stirred with 200 g. of methyl ethyl ketone at 85° C. for five hours. The chloromethylated diphenyl ether contained 8.7% by weight of o-phenoxybenzyl chloride, 41.2% of p-phenoxybenzyl chloride, 12.9% of o,p'-bis(chloromethyl)diphenyl ether, 15.8% of p,p'-bis(chloromethyl)diphenyl ether, 3.1% of tris(chloromethyl)diphenyl ether, and the remainder was largely diphenyl ether. The reaction mixture was worked up as described in Example 2 to obtain 300 g. of a light yellow viscous liquid which was found to be essentially a mixture of mono-, di-, and tri-salicylates of the hydroxymethylated diphenyl ethers corresponding in structure and molar proportion to the chloromethylated diphenyl ethers in the starting material. The compounds identified as being present were those listed as found in the product of Example 2.

These mono, di, tri, and tetrasalicylates are obtained as individual pure compounds either by conventional separation from a mixture such as described in Examples 2 and 3 or, better, by repeating the above reaction procedure using as the chloromethylated diphenyl ether reactant a single pure isomer as shown in Example 1. The properties of these individual salicylates are similar to those of the isomer prepared in Example 1.

The pure esters and their mixtures have anthelmintic properties and are useful for the control of certain internal parasites in animals. For example, trichostrongylid and ascarid worms are effectively controlled in infected mice when these are fed a diet containing as little as 0.06% by weight of either the individual compounds or mixtures of these.

These compounds are also useful as plasticizing and stabilizing additives in resinous or polymeric compositions. Mixed esters such as the products of Examples 2 and 3 which are largely di, tri, and tetrasalicylates are particularly preferred for this purpose. Polyvinyl chloride and polyvinylidene chloride compositions in particular are effectively stabilized against ultraviolet light-initiated degradation by the incorporation therein of small amounts of these polysalicylates.

I claim:
1. A compound of the formula

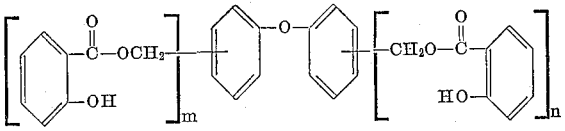

wherein $m$ and $n$ are integers from zero to two and the sum of $m$ and $n$ is at least one.

2. The compound of claim 1 wherein $m$ and $n$ are each one of the integers one and two.

3. The compound of claim 1 wherein $m$ and $n$ are each one.

4. 4,4'-oxydibenzyl disalicylate.

References Cited

UNITED STATES PATENTS 3,022,268  2/1962  Armitage et al. _____ 260—45.85

LORRAINE A. WEINBERGER, *Primary Examiner.*

S. WILLIAMS, *Assistant Examiner.*